G. POTSTADA.
METAL SHEARS.
APPLICATION FILED JAN. 28, 1908.
939,627.
Patented Nov. 9, 1909.
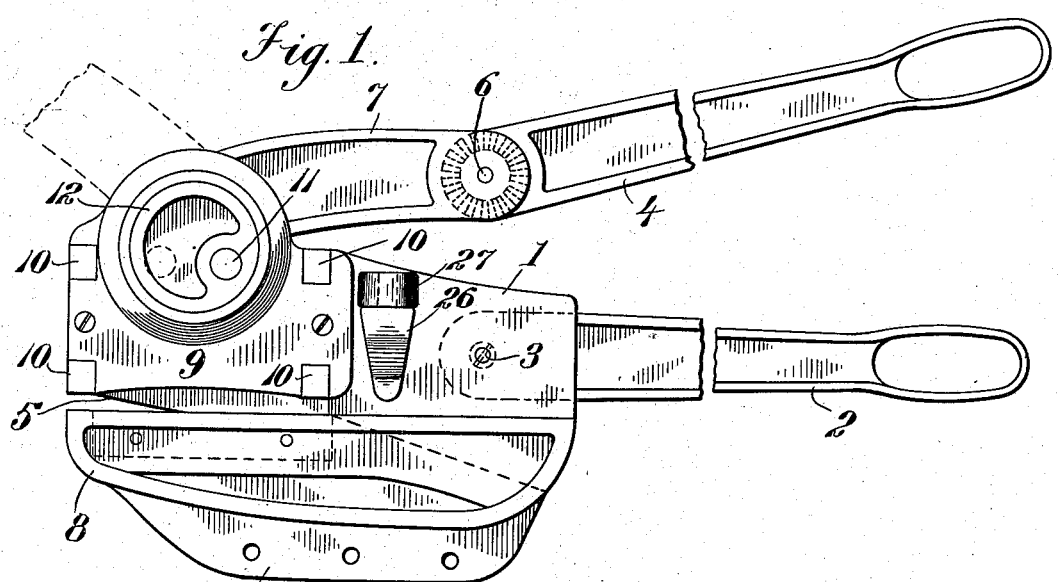
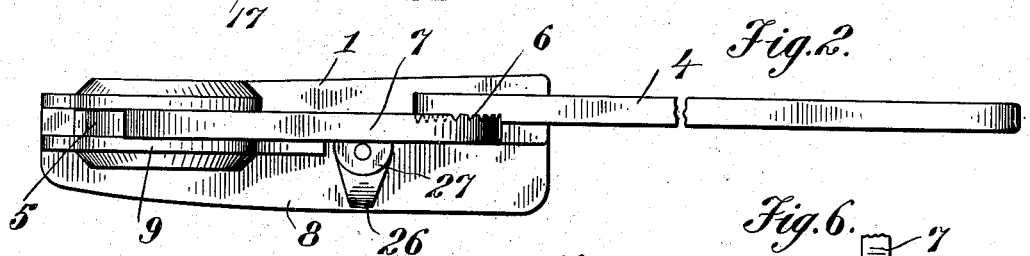
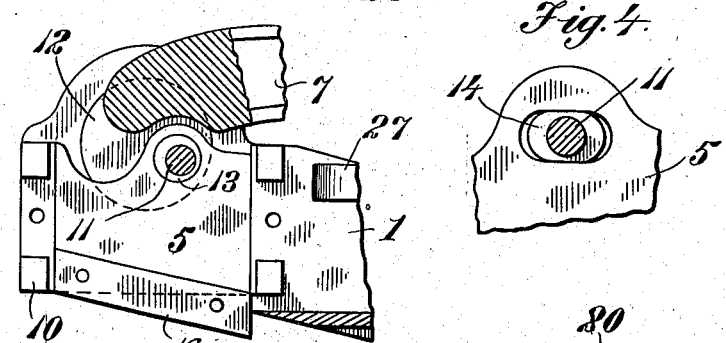
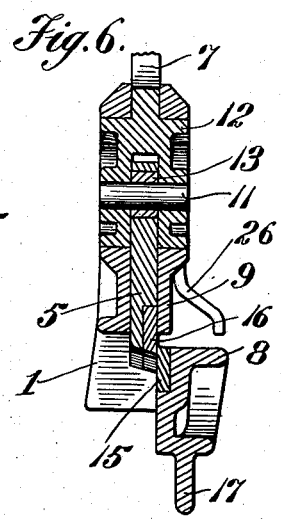
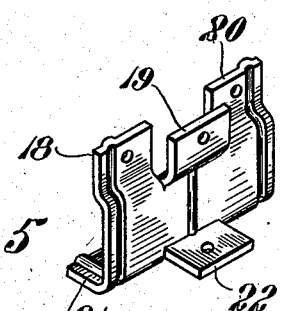
WITNESSES
INVENTOR
Geo. Potstada
BY
Medina and Griffin
ATTORNEYS

UNITED STATES PATENT OFFICE.

GEORGE POTSTADA, OF SAN FRANCISCO, CALIFORNIA.

METAL-SHEARS.

939,627.  Specification of Letters Patent.  Patented Nov. 9, 1909.

Application filed January 28, 1908. Serial No. 413,132.

*To all whom it may concern:*

Be it known that I, GEORGE POTSTADA, a subject of the Emperor of Germany, residing at San Francisco, in the county of San Francisco and State of California, have invented a new and useful Metal-Shears, of which the following is a specification in such full and clear terms as will enable those skilled in the art to construct and use the same.

This invention relates to a shears used for the purpose of cutting metal and its object is to lighten such shears and at the same time make the structural parts thereof of such strength as to permit the shears to cut off very heavy metal without in any way injuring the same.

Another object of the invention is to make the shears of such a form as to securely hold the knife in a rigid position when it is passing through the metal in spite of the fact that the cutting causes considerable side thrust on the blade of the knife.

Another object of the invention is to make a shear that will be capable of use as a bench shear, or as a hand shear, means being provided on the bottom of the shear head to secure the same in a vise, and the shears are also provided with a means whereby the handle may be placed at different angles for different work. It will also be possible to secure the shears to a bench by means of a special bracket, but this bracket does not form a part of the invention.

In the drawings in which the same numeral is applied to the same part throughout, Figure 1 is a side elevation of the shears, Fig. 2 is a plan view of the shears, Fig. 3 is a side view of the head of the shears showing the side plate removed, Fig. 4 is a view of a modified form of the means employed to allow the knife pin to move to push the knife down, Fig. 5 is a perspective view of the shear bracket, and Fig. 6 is a cross sectional view of the shear head.

The shear head 1 has the removable handle 2 which is held in place by means of the screw 3, and the pivoted handle 4 which operates the knife 5. The handle 4 is jointed at 6 in order that the shear may be used in a number of different positions said handle 4 being held in its given position by means of a series of radial notches in the short piece 7 of the handle 4. The head 1 has the jaw 8 projecting from its rear end the space between said jaw and the main part of the head being such as to allow the maximum sheet of metal to be cut to pass through between it and the plate 9 which secures the knife 5 in its proper place.

The knife 5 operates in a vertical channel in the knife head and it is held in the vertical position by means of the plate 9 which is secured to the head by means of screws. In order that there may be no shearing stress on the screws holding the plate 9 in its position the head is provided with four lugs 10 which are seated in cuts in the plate 9 near the corners thereof. The knife is moved by means of the pin 11 which passes through the eccentric head 12 which is a part of the handle piece 7 and eccentric operating in an eye in the head and a similar eye in the plate 9. This head 12 has two parts, one bearing in the plate 9 and the other bearing in the top part of the head 1, said parts being spaced such a distance from each other as to allow the knife 5 to be inserted between them, note Fig. 6. The pin 11 is placed out of the center of the head 12 so that when the same is rotated the pin will have a motion with respect to the head in a direction substantially at right angles with the face of the jaw 8. Since the knife moves in a fixed channel and the pin moves in a circular path it is necessary to have some play at the point of connection of the pin and the knife and this play may be given either by means of a slot in the knife 5, or to give the full strength of the pin through the knife a small eccentric 13 may be used to allow the pin to move the necessary amount, or a block 14 may be used to give the pin the necessary amount of lateral movement.

Since the material of the head is cast steel a tool steel knife 15 is let into the lower jaw and a similar tool steel knife 16 is let into the knife 5 to strengthen its edge. When the shear is used with heavy metal it is necessary to provide some means to prevent the same from being turned sidewise, since the knife will cause it to turn over when the cut is about to be made. This means consists of a heavy finger 26 which projects out from the body of the shear head, a hole being drilled in the lug 27 cast on the side of the head to take the upper end of the pin. This pin projects downwardly from the shear head and the lower end touches the plate of metal being cut and effectually prevents the shears from being twisted to one side when a heavy sheet of metal is being cut.

The knife head is provided with transverse ribs in order to strengthen the same, and it also has a depending rib 17 for the purpose of securing the shears in a vise when it is not wished to use both handles. If it is wished to provide a special bracket to hold the shears a sheet of metal may be pressed as shown in Fig. 5 and the rib 17 of the knife may be placed between the lips 18, 19 and 20 thereof, pins or small bolts being used to secure the shears to the bracket. The bracket is held in place on a bench or table by means of the feet 21 and 22 there being another foot on the corner opposite the lip 20, but which is not shown in the drawing. The plate from which this bracket is made may be corrugated as shown in order to make it stronger. The handle may be placed in the position shown in dotted lines in Fig. 1 if a knife having a reverse slant is used.

Having thus described my invention what I claim as new and desire to secure by Letters Patent of the United States is as follows:

1. In a metal shear, a shear head having a knife channel and an eye, a plate secured to the head and having an eye opposite the eye in the knife head, a knife sliding between the plate and the head in the knife channel thereof, a double eccentric adapted to rotate in the eyes of the head and the plate, lugs carried by the head and adapted to prevent movement of the plate in the plane of the face of the head, a pin carried by the eccentric and adapted to move the knife when the eccentric is turned in the eyes of the plate and head, and a movable block surrounding the pin and movable in the knife in a line parallel with the sheet of metal to be cut.

2. In a metal shear, a shear head having a knife channel and an eye, a plate secured to the head and having an eye opposite the eye of the knife head, a knife sliding in the channel in the knife head, an eccentric having one part movable in the eye of the plate and another part movable in the eye of the knife head said knife being carried between the two parts of the eccentric, and a pin passing through the eccentric and supporting the knife.

3. In a metal shear, a shear head having a knife channel and an eye near the top thereof, a plate secured to the head and having an eye opposite the eye of the knife head, lugs adapted to prevent the plate from moving in the plane of the knife, a knife movable in the knife channel of the head an eccentric having a part movable in the head of the shear and another part movable in the eye of the plate secured thereto, said knife extending up between the two parts of the eccentric, and a pin securing the knife to the eccentric and adapted to move the knife when the eccentric is moved.

4. In a metal shear, a head having two eyes therein and a knife channel, an eccentric adapted to fit the eyes, and a knife carried between the parts of the eccentric bearing on each eye.

5. In a metal shear, a shear head having a knife channel and two eyes, an eccentric carried in the eyes, a knife carried by the eccentric and adapted to be moved thereby, a finger secured to one side of the shear head and extending downwardly and outwardly from the same and adapted to bear on a sheet of metal being cut, and means to operate the shear.

6. In a metal shear, a shear head having a channel for a knife and an eye in the top thereof, a plate secured to the side of the shear head and having an eye opposite the eye in the top of the head, a knife carried in the knife channel, an eccentric in the eyes and adapted to move the knife, means to secure the plate to the shear head, means to prevent the pressure of the cutting from injuring said securing means, and means to prevent the shear from turning when a thick plate of metal is being cut.

7. In a metal shear, a shear head having an eye in the top thereof, a plate secured to the side of the head, a knife adapted to slide between the plate and the head, means to move the knife, a lug carried by the shear head and adapted to bear on the plate being cut to prevent the shear from turning sidewise when a thick plate of metal is being cut, and a pocket for the insertion of a handle in one end of the shear head.

8. In a metal shear, a shear head having a knife channel and an eye therein, a plate having a like eye therein immediately opposite the eye in the head, means to secure the plate to the head, lugs projecting from the head and adapted to prevent the stress on the plate from being transmitted to the plate securing means, an eccentric having a bearing in each eye, and a knife carried by the eccentric in the knife channel in the head.

9. In a metal shear, a shear head having a knife channel and an eye therein, a plate having an eye similar to the eye in the head and immediately opposite the same, means to secure the plate to the head, lugs projecting from the head and taking in notches in the plate whereby the thrust on the plate is prevented from acting on the plate securing means, an eccentric having a bearing in each of the eyes, a knife carried by the eccentric between its bearings, and means to turn said eccentric whereby the knife is reciprocated.

In testimony whereof I have set my hand this 21st day of January A. D. 1908, in the presence of two subscribed witnesses.

GEORGE POTSTADA.

Witnesses:
C. P. GRIFFIN,
C. SANDERS.